(12) United States Patent
Herrera

(10) Patent No.: US 11,147,279 B2
(45) Date of Patent: Oct. 19, 2021

(54) MINI TACO OVEN

(71) Applicant: Casa Herrera, Inc., Pomona, CA (US)

(72) Inventor: Michael L. Herrera, Los Alamitos, CA (US)

(73) Assignee: CASA HERRERA, INC., Pomona, CA (US)

(*) Notice: Subject to any disclaimer, the term of this patent is extended or adjusted under 35 U.S.C. 154(b) by 256 days.

(21) Appl. No.: 15/144,534

(22) Filed: May 2, 2016

(65) Prior Publication Data

US 2016/0316769 A1    Nov. 3, 2016

Related U.S. Application Data

(60) Provisional application No. 62/155,377, filed on Apr. 30, 2015.

(51) Int. Cl.
| | | |
|---|---|---|
| A21C 11/00 | (2006.01) | |
| A21B 5/00 | (2006.01) | |
| A21C 9/08 | (2006.01) | |

(52) U.S. Cl.
CPC .............. *A21C 11/004* (2013.01); *A21B 5/00* (2013.01); *A21C 9/086* (2013.01); *A21C 9/088* (2013.01)

(58) Field of Classification Search
CPC ......... A21C 22/04; A21C 3/02; A21C 11/004; A21C 9/086; A21C 9/088; A23L 7/13; A23P 30/10
USPC .......... 99/330, 339–340, 353–355, 372–373, 99/386, 403–407, 409–410, 426, 496, 99/499, 505, 512, 537
See application file for complete search history.

(56) References Cited

U.S. PATENT DOCUMENTS

| | | | | |
|---|---|---|---|---|
| 3,063,846 A | * | 11/1962 | Polin .................. | A21B 5/00 426/234 |
| 3,231,387 A | * | 1/1966 | Tsuchiya ............. | A21B 5/00 426/446 |
| 3,869,971 A | * | 3/1975 | Driscoll .............. | A47J 37/1214 99/353 |
| 4,744,293 A | * | 5/1988 | Shimokawa ........ | A47J 37/1214 99/330 |

(Continued)

FOREIGN PATENT DOCUMENTS

CA    2370871 A1 *  8/2003  ............ A47J 37/041

*Primary Examiner* — Dana Ross
*Assistant Examiner* — Joe E Mills, Jr.
(74) *Attorney, Agent, or Firm* — Myers Andras, LLP; Joseph C. Andras

(57) ABSTRACT

A food production system creating folded par-baked units (e.g. mini tacos) for frying, including a sheeter for continuously creating a succession of substantially flat raw dough units and an oven having a plurality of hanging conveyors (e.g. chains). The hanging conveyors are narrow so that the raw dough units raw fold down on either side thereof to form folded dough units. The oven includes a first plurality of cross-burners to pre-heat the hanging conveyor for transferring shape-setting heat directly from the hanging conveyor to the folded dough units. The oven further includes a second plurality of substantially longitudinal shape-setting burners that are substantially in parallel with and adjacent to the top dough carrying side of the hanging conveyor for providing further shape-setting heat to the folded dough units. The oven discharges par-baked units ready for frying.

13 Claims, 5 Drawing Sheets

(56) References Cited

U.S. PATENT DOCUMENTS

| | | | | |
|---|---|---|---|---|
| 5,131,835 A * | 7/1992 | Rini | ......................... | A21B 5/06 |
| | | | | 426/499 |
| 5,542,345 A * | 8/1996 | Gongwer | .............. | A47J 37/045 |
| | | | | 99/345 |
| 5,584,237 A * | 12/1996 | Moshonas | ............... | A21B 1/245 |
| | | | | 126/21 A |
| 5,811,137 A * | 9/1998 | Clark | ....................... | A21C 3/02 |
| | | | | 100/168 |
| 6,408,842 B1 * | 6/2002 | Herrera | .................... | A21B 1/02 |
| | | | | 126/41 C |
| 9,723,865 B2 * | 8/2017 | Hunzeker | ................. | A23L 5/30 |
| 2004/0142062 A1 * | 7/2004 | Herrera | .................... | A21C 3/02 |
| | | | | 425/298 |
| 2013/0078345 A1 * | 3/2013 | Bender | ................. | A21B 3/132 |
| | | | | 426/143 |
| 2014/0352550 A1 * | 12/2014 | Haas | ...................... | H05B 6/107 |
| | | | | 99/339 |

* cited by examiner

MINI TACO OVEN

RELATED APPLICATIONS

This application claims the benefit of U.S. Provisional Patent Application Ser. No. 62/155,377, filed Apr. 30, 2015.

BACKGROUND OF THE INVENTION

Field of the Invention

This application relates generally to assembly line food production machinery and, more particularly, to a mini taco oven.

Description of the Related Art

In the prior art, one approach to making full-sized taco shells is to bake raw dough pieces on a flat conveyor and then transfer the baked dough pieces into a male/female taco-shaped mold that is moved through the hot oil of a fryer. While this approach may be a reasonable way to manufacture full-sized taco shells, it is impractical for the production of smaller snack items such as mini-taco chips.

The prior art has, to our knowledge, not developed an effective way of quickly and efficiently producing mini tacos, i.e. small tortilla chips that have a taco-shaped fold that make the tortilla chip especially desirable for gathering dip or salsa. There remains a need, therefore, for an effective, cost-efficient oven for creating tortilla chips that are shaped like mini-tacos.

DETAILED DESCRIPTION OF THE PREFERRED EMBODIMENTS

Figure 1:
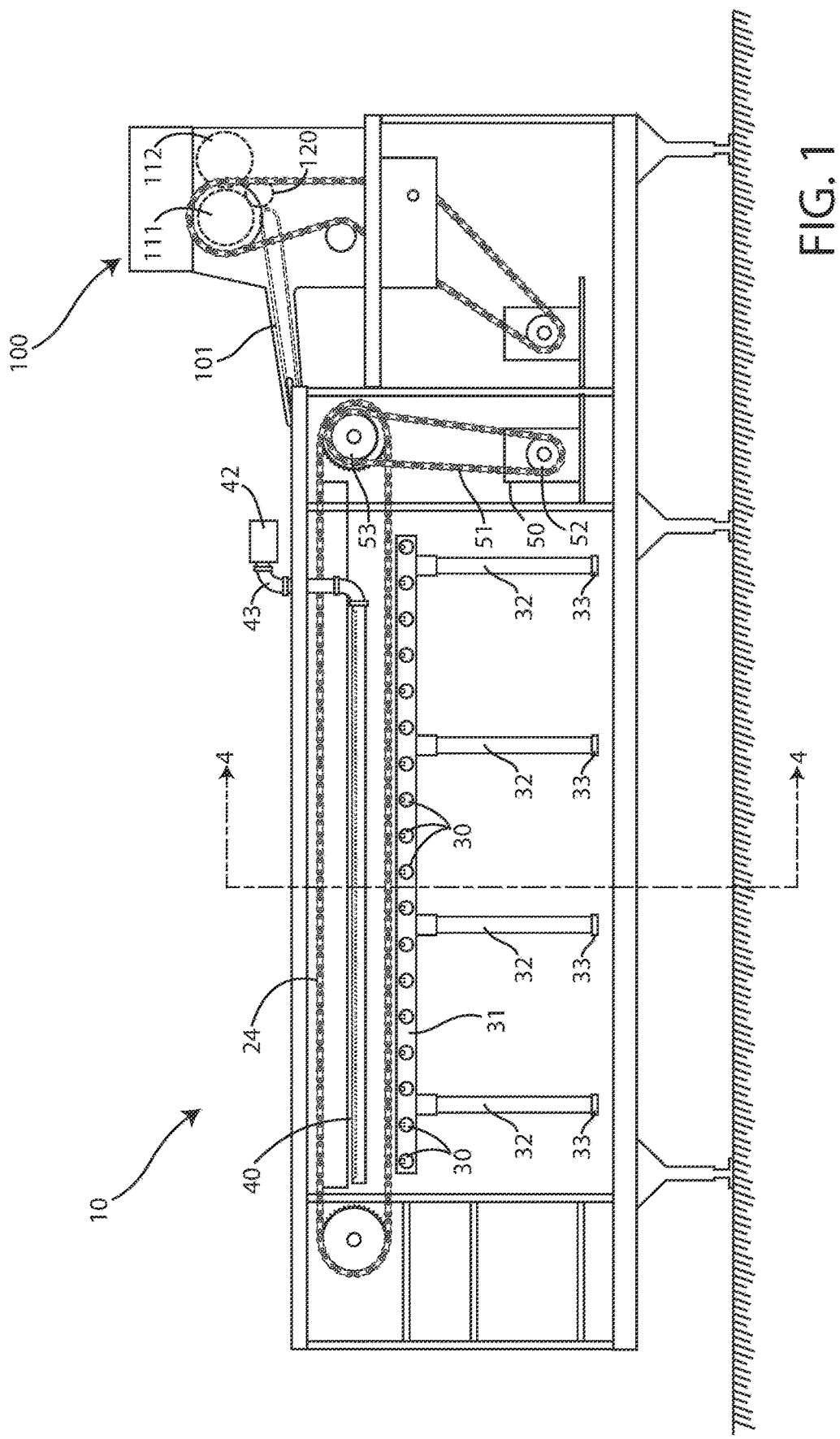
FIG. 1 is a elevational side view of a mini taco oven 10 that is fed by a sheeter 100 having a mesh discharge conveyor 101, the product flow being from right to left.

FIGS. 1 to 6 show a presently preferred embodiment of a mini taco oven 10 according to a first embodiment of the present invention. The oven 10 generally comprises a frame (not separately numbered), side walls, etc., that cooperatively form a volumetric space that may be heated for baking product moving inside of the oven. The exact configuration of the oven is not critical to the present invention.

As shown, the preferred oven 10 is fed by a four-row sheeter 100 that creates raw dough pieces 81, 82, 83, 84 from masa dough that is fed between two rollers 111, 112 to form a dough sheet against which a cutter roller 120 rotates. The dough pieces 81, 82, 83, 84 created by the sheeter 100 are quickly and effectively transferred to the oven by a mesh discharge conveyor 101. More specifically, the dough pieces are transferred onto four corresponding "hanging conveyors" 21, 22, 23, 24 that are move within the oven 10. When the raw dough pieces 81, 82, 83, 84 land on the top of the hanging conveyors 21, 22, 23, 24, they fold downward on either side of the conveyors, under their own weight, to begin taking on a taco-shape.

In operation, the sheeter 100 outputs four rows of raw dough pieces 81, 82, 83, 84 onto its mesh discharge conveyor 100, and the mesh discharge conveyor 101 transfers those dough pieces 81, 82, 83, 84 onto the four hanging conveyors 21, 22, 23, 24, the dough pieces 81, 82, 83, 84 folding down and around the heated hanging conveyors 21, 22, 23, 24, due to their own mass and the raw pliable nature of the raw masa dough.

The dough pieces 81, 82, 83, 84 advancing, from right to left, toward the discharge end of the oven 10 while being par-baked into the desired mini-taco shape by the overall heat of the oven and also by hanging conveyors 21, 22, 23, 24 that are heated by the cross-burners 30 and by the longitudinal shape-setting burners 40.

The side burners 40 cook the sides of the raw dough pieces 81, 82, 83, 84 but, because they are laterally away from the dough pieces, are not directly impinging on the bottom edges (e.g. 84e in FIG. 5) of the dough piece's down-turned sides, those edges do not get burned.

The dough pieces 81, 82, 83, 84 are eventually set into baked units having the shape of a "mini-taco," at the discharge end of the oven 10 where, in this prototype embodiment, they simply drop off of the hanging conveyors 21, 22, 23, 24, assisted if necessary by a wire stretched across the bottom of the hanging conveyor. While not shown here, the baked units would normally drop directly into the hot oil of a fryer, or perhaps, onto a transfer conveyor that carries them to the fryer.

In this embodiment of a mini-taco oven 10, the hanging conveyors 21 22, 23, 24 are comprised of chains that are about ¾" wide, so the raw dough units 81, 82, 83, 84 take on a wide, substantially square-bottomed shape that is suitable for holding lots of dip or salsa, and that has large radius corners that create a durable product that is less prone to breakage during transport or consumption. The hanging conveyor 21, 22, 23 or 24, however, could be formed from a narrower or wider chain, a braided cable, a solid wire, etc., and thereby present a different forming shape if a different shaped chip were desired.

The prototype or other embodiments offer the following characteristics and advantages:

Transitioning directly from the exit rows of a standard sheeter 100, to a mesh discharge conveyor 101, and the mesh discharge conveyor 101 drops the dough pieces 81, 82, 83, 84 directly onto a longitudinally moving hanging conveyors 21, 22, 23, 24 (chain is used in this embodiment, but could be implemented with a braided cable, a solid wire, bars, etc.)

The location and spacing between the receiving and or discharging ends of the hanging conveyors 21, 22, 23, 24 can be made adjustable to accommodate different product configurations, if desired, but the alignment could just be permanently built in.

The preferred mini-taco oven 10 features:

Hanging raw product pieces 81, 82, 83, 84 and baking them into shape to form baked units 91, 92, 93, 94

Heating the return part of the hanging conveyor 21, 22, 23, 24 to set fold lines into the raw product pieces 81, 82, 83, 84 and form the desired shape in the baked units 91, 92, 93, 94

Heating in between the longitudinally moving rows 21, 22, 23, 24 of product to bake the sides of the raw product pieces 81, 82, 83, 84. If the burners directly beneath the top transport side of the hanging conveyors 21, 22, 23, 24 were transverse, the flame would just toast the lowest hanging part of each dough unit and leave the sides raw. This arrangement toasts the sides of the product pieces without burning the edges or tips.

Optionally, a ceramic reflector plate 61 (horizontal, diagonal, etc.) is preferably positioned above the moving product rows 21, 22, 23, 24 to reflect and retain heat near the product folds The oven may also be used to make full-size taco shells FIG. 1 is a side view of the mini taco oven 10 with the sides removed, showing the return side of the hanging conveyors 21, 22, 23, 24 and a plurality of burners 30 (here cross burners) for heating the interior space of the oven and the return side of the hanging conveyors. Also shown are the upper transport side of the hanging conveyors 21, 22, 23, 24, the return side of the hanging conveyors, the cross burners 30, and the longitudinal shape-setting burners 40. FIG. 1 also shows the electric motor 50 that moves the hanging conveyors 21, 22, 23, 24 via a chain 51 and pair of sprockets 52, 53.

A manifold 31 feeds the cross burners 30 and vertical drops 32 are provided that terminate at an air valve 33 and operate according to the Venturi principal, the valve 33 being adjustable to vary the air to fuel mixture of the cross-burners 30 located near each drop 32 in order to provide a more efficient burn.

Figure 2:
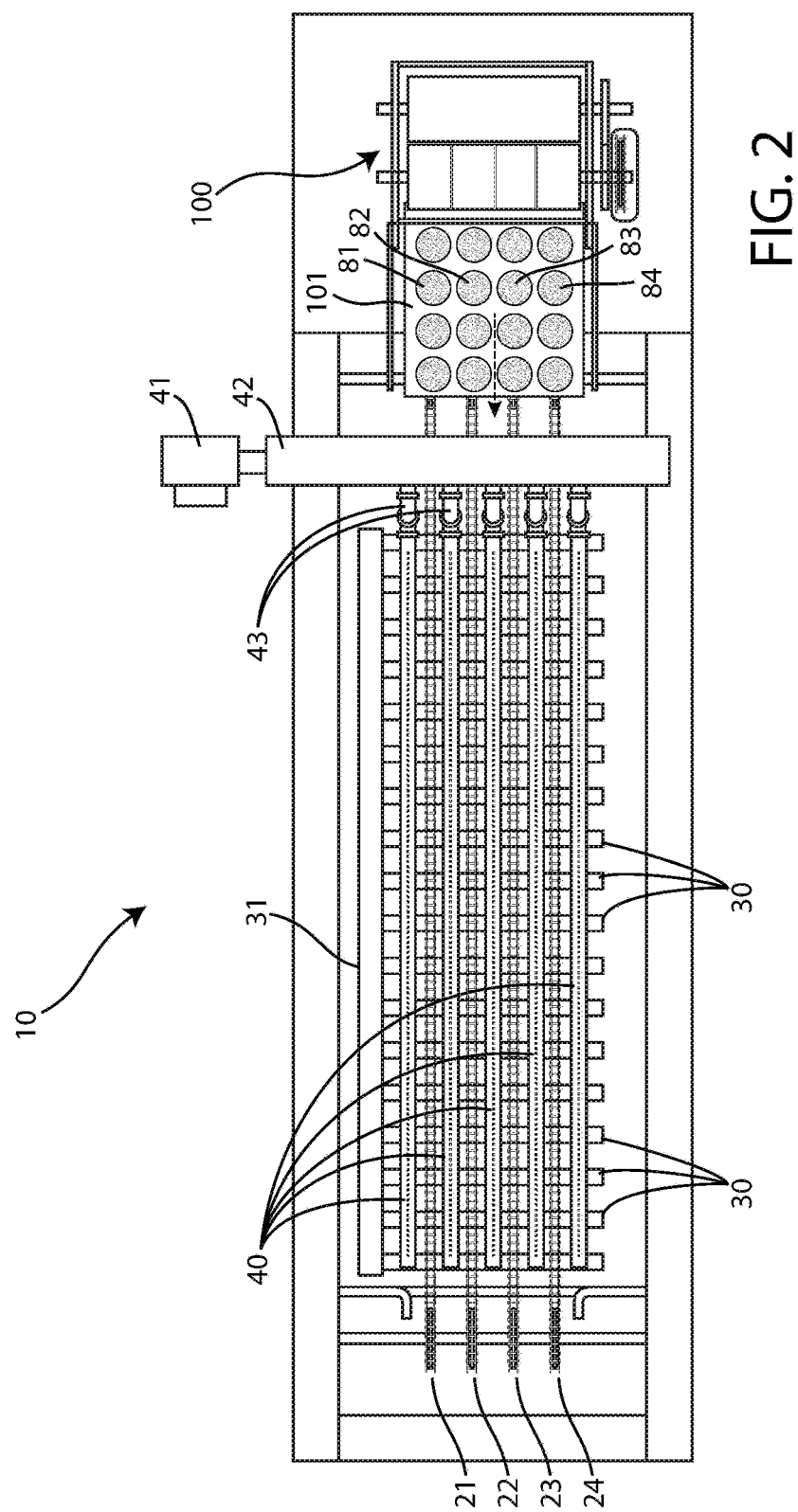
FIG. 2 is a top plan view of the sheeter 100 and its mesh discharge conveyor 101 terminating above four longitudinal hanging conveyors 21, 22, 23, 24 (here chains) to transfer dough units 81, 82, 83, 84 thereto.
Figure 4:
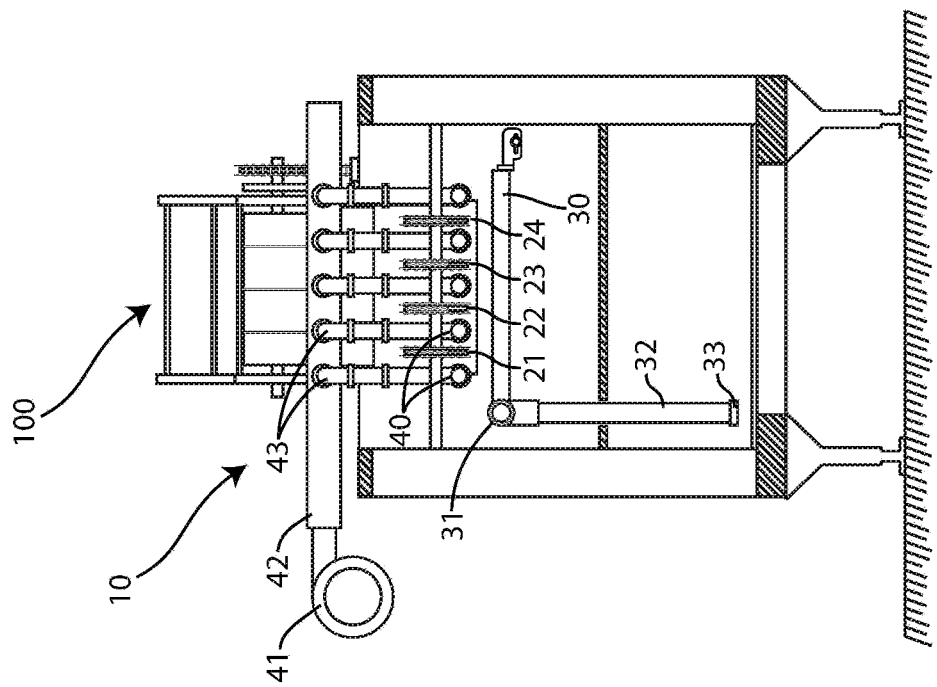
FIG. 4 is a cross-sectional view of the mini taco oven of FIG. 1 taken along section lines 3-3 showing the cross burners 30 and the longitudinal burners 40.
Figure 3:
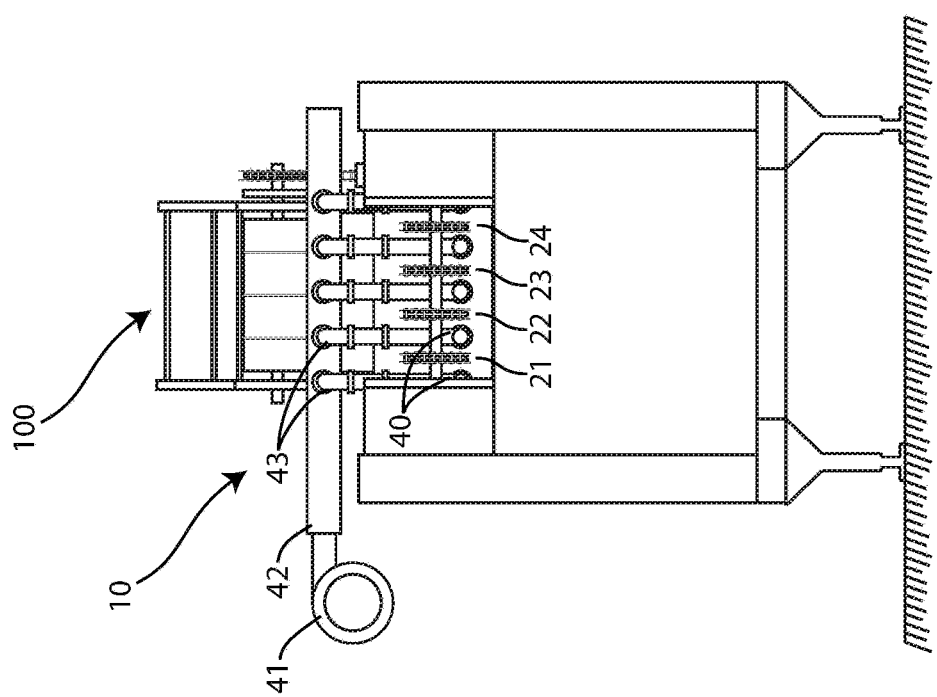
FIG. 3 is an elevational end view of the mini taco oven 10 of FIG. 1.

FIGS. 1 and 2 also show the five shape-setting longitudinal burners 40, with the blower 41, manifold 42, and the five feed pipes 43 that feed those burners, the burners 40 being generally perpendicular to the cross burners 30 and generally parallel to and interposed near and preferably in between and/or on either side of the hanging conveyors 21, 22, 23, 24

As shown, the longitudinal burners 40 (currently "ribbon burners") are preferably arranged lengthwise and in between the hanging conveyors 21, 22, 23, and 24 and product rows such that heat comes up and heats one side of one taco shell and, if present, one side of an adjacent taco shell. Where the oven has four hanging conveyors 21, 22, 23, 24, the preferred number of longitudinal burners 40 is five.

Figure 5:
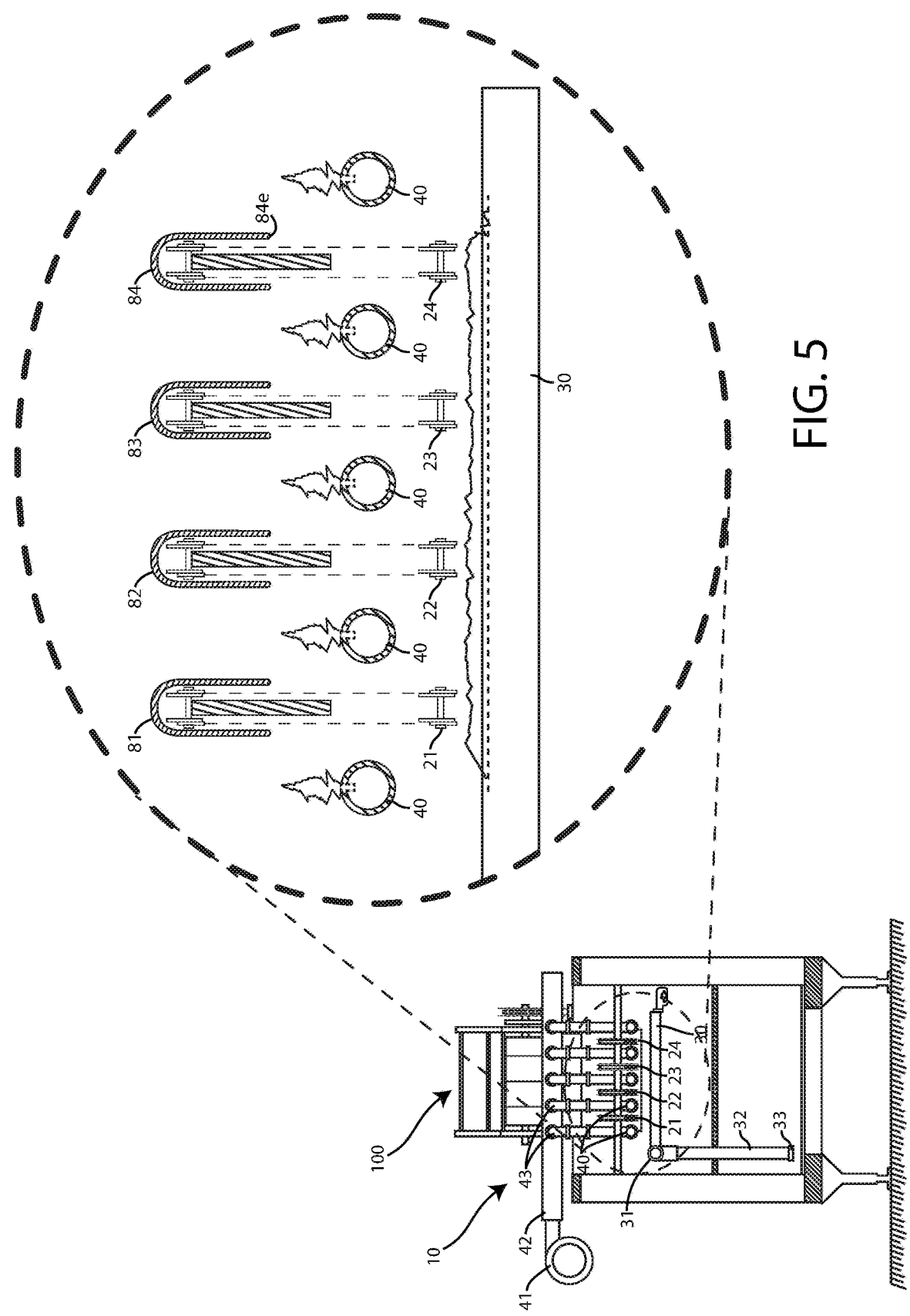
FIG. 5 is a close-up view of the cross burners 30 and longitudinal burners 40 showing how the flame from the cross burners 30 pre-heat the return side of the hanging conveyors 21, 23, 23, 24 and how the flame from the longitudinal burners 40 do not impinge directly on the folded dough units 81, 82, 83, 84.

FIG. 5 is a close-up view of, looking back toward the sheeter 100, showing the lit cross-burners 30 that are located beneath the return-side of the hanging conveyors 21, 22, 23, 24. As shown, the shape-setting burners 40 and hanging conveyors 21, 22, 23, 24 are arranged so that flame of the nearest side burner 40 is located close to the nearest side of the adjacent hanging conveyor 24.

As also shown in FIG. 5, the cross burners 30 are located underneath the return side of the hanging conveyors 21, 22, 23, 24 to help heat up the chains and avoid having a raw spot where the dough units 81, 82, 83, 84 fold over the chains 21, 22, 23, 24. This helps set the fold and prevents it from staying raw and soft. The cross burners 30 that are below and generally perpendicular to the conveyors 21, 22, 23, 24 also function to generally heat the interior space of the oven 10 when it is fully closed, but it may be desirable to include additional burners, e.g. separate burners that are arranged in alignment with some or all the return portion of each hanging conveyor.

In an earlier prototype, the shape-setting burners were located above the products and were pushing a flame down, but it was tougher to control that flame, it was prone to backfires, and it seemed to be inefficient.

The inventor believes that this unique oven 10 can control the texture of the product by imputing the desired percentage of toast points versus blisters, in addition to setting the desired shape before frying.

Figure 6:
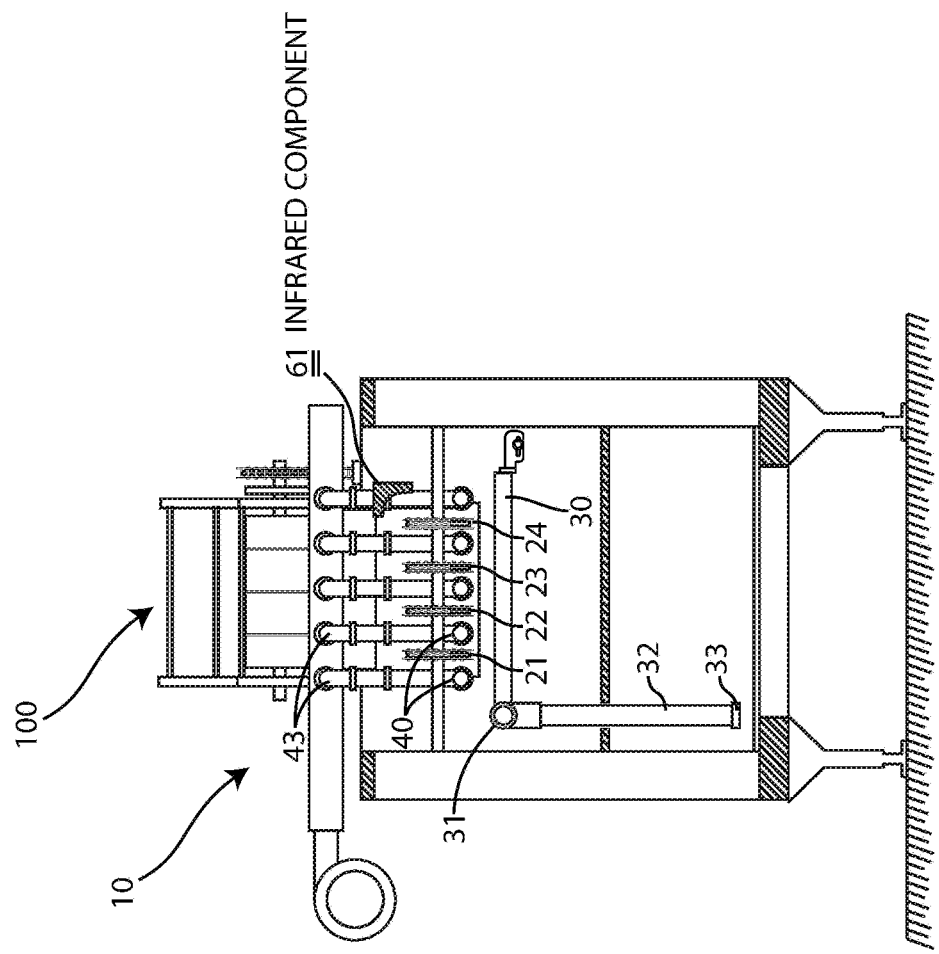
FIG. 6 shows one small section of an infrared reflector 61 (typically ceramic) that could be located adjacent to the hanging conveyors 21, 22, 23 24, for some or all of their length, in order to enhance the oven's ability to set the desired shape or to provide for a more efficient set that would increase the production rate by allowing the hanging conveyors 21, 22, 23, 24 to be moved at a faster rate and reduce the needed dwell time within the oven 10.

FIG. 6 shows a small section of an infrared component 61 (typically ceramic) that would be located adjacent to the hanging conveyors 21, 22, 23 24, for some or all of their length, in order to enhance the oven's ability to set the desired shape or to provide for a more efficient set that would increase the production rate by allowing the hanging conveyors 21, 22, 23, 24 to be moved at a faster rate and reduce the needed dwell time within the oven 10. The infrared component 61 could be a simple reflector of the thermal energy generated by the longitudinal burners 40, or it could be provided with its own fuel source and independently generate infrared radiation.

Many other variations and enhancements are possible. For example, as the baked unit 10 shaped like a mini-taco is sliding down at the discharge end of the oven 10, it may be slid and rotated so that the fold is on the bottom as it continues into the fryer, rather than on the top. The chips like to float so, if it were rotated fold-side down before being dropped into the hot oil of the fryer, and move along while submerged, the sides would be more reliably held in their baked shape, and the resulting product would have a more consistent shape. It may also be possible to keep something in the middle of the taco shell shape, as it progresses along within the fryer, to prevent the sides from folding inward, but it would be a linear, constantly moving frying process.

I claim:

1. A food production system for creating folded par-baked dough units for frying comprising;

a sheeter for continuously creating a succession of flat raw dough units of desired first shape;

a discharge conveyor for discharging the raw dough units from the sheeter; and an oven for creating the folded par-baked dough units for frying by reshaping the raw dough units into a second shape that is non-flat and par-baking them while they are moved through the oven in that second shape, the oven comprising:

a frame with a longitudinal oven axis and a heating space, the oven located adjacent to the discharge conveyor;

a hanging conveyor having an elongated configuration with a longitudinal conveyor axis that is parallel with the longitudinal oven axis and located at least partially within the heating space of the oven, the hanging conveyor having an input end and a discharge end, a top dough carrying side for carrying raw dough units from the input end to the discharge end, and a bottom return side, the hanging conveyor receiving raw dough units that are discharged by the discharge conveyor, the hanging conveyor being narrower than the raw dough units such that raw dough units received by the hanging conveyor fold down on either side thereof to form folded dough units, and the top dough carrying side of the hanging conveyor moving within the heating space of the oven in parallel with the longitudinal conveyor axis and longitudinal oven axis;

a motor for driving the hanging conveyor;

a plurality of cross-burners that each have an elongated configuration with a longitudinal cross-burner axis that is non-parallel with the longitudinal oven axis, are located below the bottom return side of the hanging conveyor, and pre-heat the hanging conveyor for transferring shape-setting heat from the hanging conveyor to the folded dough units that are carried by the hanging conveyor; and a plurality of longitudinal shape-setting side burners that each have a longitudinal shape-setting side burner axis that is parallel with the longitudinal oven axis and longitudinal conveyor axis and are located below a horizontal plane containing the top dough carrying side of the hanging conveyor and above a horizontal plane containing the bottom return side of the hanging conveyor and in parallel with and spaced laterally to either side of the top dough carrying side of the hanging conveyor to be horizontally displaced from and not directly beneath the top dough carrying side of the hanging conveyor and the folded dough units carried thereby and not directed beneath downward edges of the folded dough units, for providing further shape-setting heat to the folded dough units that are carried by hanging conveyor without impinging directly onto the downward edges of the folded dough units, the hanging conveyor moving the folded dough units from the input end to the discharge end, within the oven, to form the folded par-baked dough units.

2. The food production system of claim 1 wherein the oven comprises X hanging conveyors and X+1 longitudinal shape-setting side burners.

3. The food production system of claim 2 where there are four hanging conveyors and five longitudinal shape-setting side burners.

4. The food production system of claim 1 wherein the hanging conveyor comprises one of a chain, a cable, and a bar.

5. The food production system of claim 1 further comprising a plurality of infrared reflectors arranged in parallel with and adjacent to the hanging conveyors and longitudinal shape-setting side burners.

6. The food production system of claim 1 further comprising a plurality of infrared burners arranged in parallel with and adjacent to the hanging conveyors and longitudinal shape-setting side burners.

7. A food production system for creating folded par-baked dough units for frying comprising;

a sheeter for continuously creating a succession of flat raw dough units of desired first shape;

a discharge conveyor for discharging the raw dough units from the sheeter; and an oven for creating the folded par-baked dough units for frying by reshaping the raw dough units into a second shape that is non-flat and par-baking them while they are moved through the oven in that second shape, the oven comprising:

a frame with a longitudinal oven axis and a heating space, the oven located adjacent to the discharge conveyor;

a hanging conveyor having an elongated configuration with a longitudinal conveyor axis that is parallel with the longitudinal oven axis and located at least partially within the heating space of the oven, the hanging conveyor having an input end and a discharge end, a top dough carrying side for carrying raw dough units from the input end to the discharge end, and a bottom return side, the hanging conveyor receiving raw dough units that are discharged by the discharge conveyor, the hanging conveyor being narrower than the raw dough units such that raw dough units received by the hanging conveyor fold down on either side thereof to form folded dough units, and the top dough carrying side of the hanging conveyor moving within the heating space of the oven in parallel with the longitudinal conveyor axis and longitudinal oven axis;

a motor for driving the hanging conveyor; and a plurality of longitudinal shape-setting side burners that each have a longitudinal shape-setting side burner axis that is parallel with the longitudinal oven axis and longitudinal conveyor axis and are located below a horizontal plane containing the top dough carrying side of the hanging conveyor and above a horizontal plane containing the bottom return side of the hanging conveyor and in parallel with and spaced laterally to either side of the top dough carrying side of the hanging conveyor to be horizontally displaced from and not directly beneath the top dough carrying side of the hanging conveyor and the folded dough units carried thereby, and not directly beneath downward edges of the folded dough units, for providing further shape-setting heat to the folded dough units that are carried by hanging conveyor without impinging directly onto the downward edges of the folded dough units, the hanging conveyor moving the folded dough units from the input end to the discharge end, within the oven, to form the folded par-baked dough units.

8. The food production system of claim 7 wherein the oven comprises X hanging conveyors and X+1 longitudinal shape-setting side burners.

9. The food production system of claim 8 where there are four hanging conveyors and five longitudinal shape-setting side burners.

10. The food production system of claim 7 wherein the hanging conveyor comprises one of a chain, a cable, and a bar.

11. The food production system of claim 7 further comprising a plurality of infrared reflectors arranged in parallel with and adjacent to the hanging conveyors and longitudinal shape-setting side burners.

12. The food production system of claim 7 further comprising a plurality of infrared burners arranged in parallel with and adjacent to the hanging conveyors and longitudinal shape-setting side burners.

13. The food production system of claim 7 further comprising a plurality of cross-burners that each have an elongated configuration with a longitudinal cross-burner axis that is non-parallel with the longitudinal oven axis, are located below the bottom return side of the hanging conveyor, and pre-heat the hanging conveyor for transferring shape-setting heat from the hanging conveyor to the folded dough units that are carried by the hanging conveyor.

\* \* \* \* \*